3,461,021
APPARATUS FOR COOLING AND COMPRESSING THE HOT FUSED BEADS OF PLIES OF PLASTIC MATERIAL WHICH HAVE BEEN HEAT-SEALED
Friedhelm Brinkmeier, Ladbergen, and Gerhard Fiks and Kurt Rochla, Lengerich, Germany, assignors to Windmoller & Holscher, Lengerich, Germany
Filed Sept. 14, 1965, Ser. No. 487,252
Claims priority, application Germany, Mar. 9, 1965, W 38,717
Int. Cl. B65b 51/18, 51/32
U.S. Cl. 156—498     16 Claims

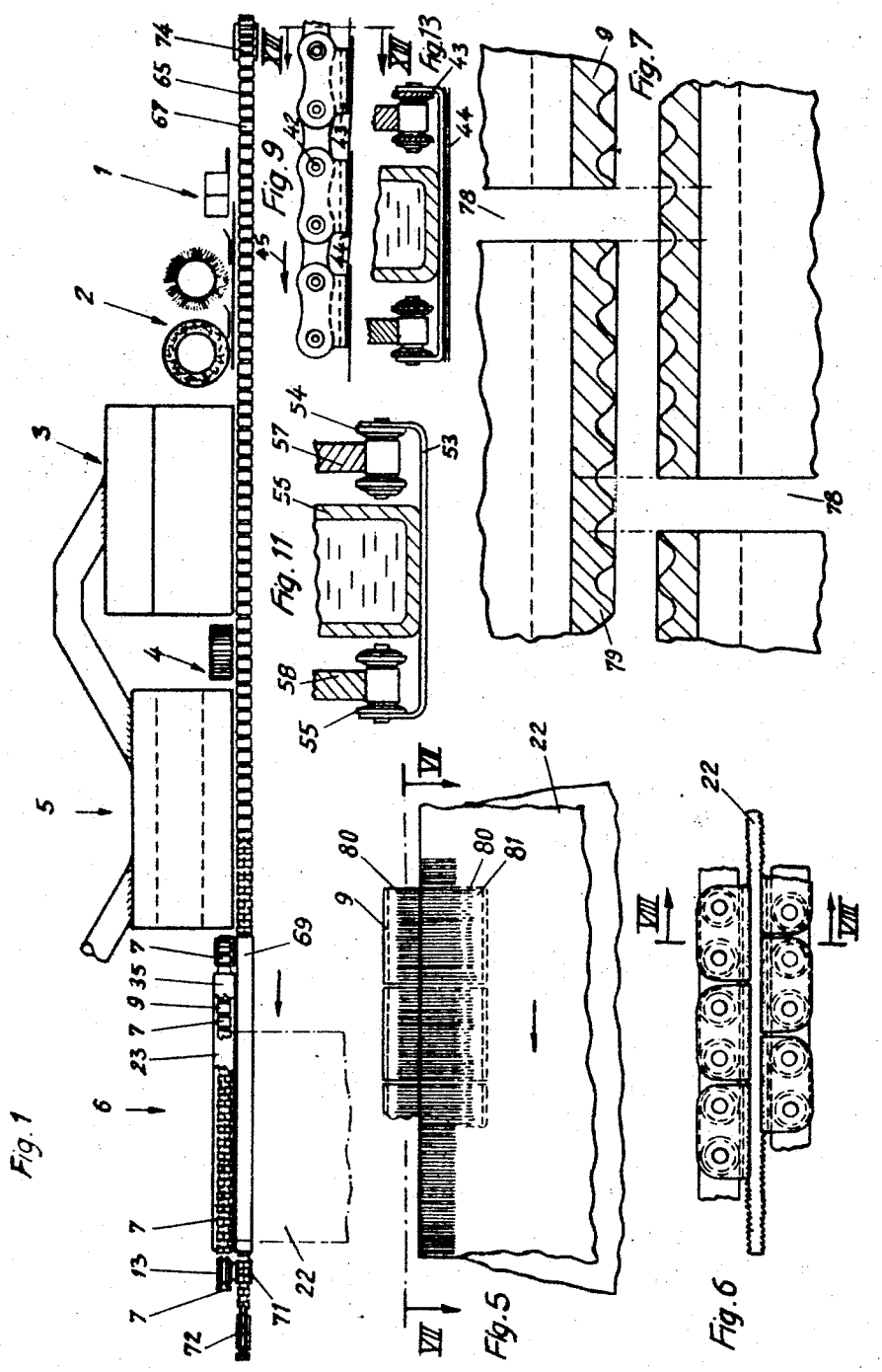

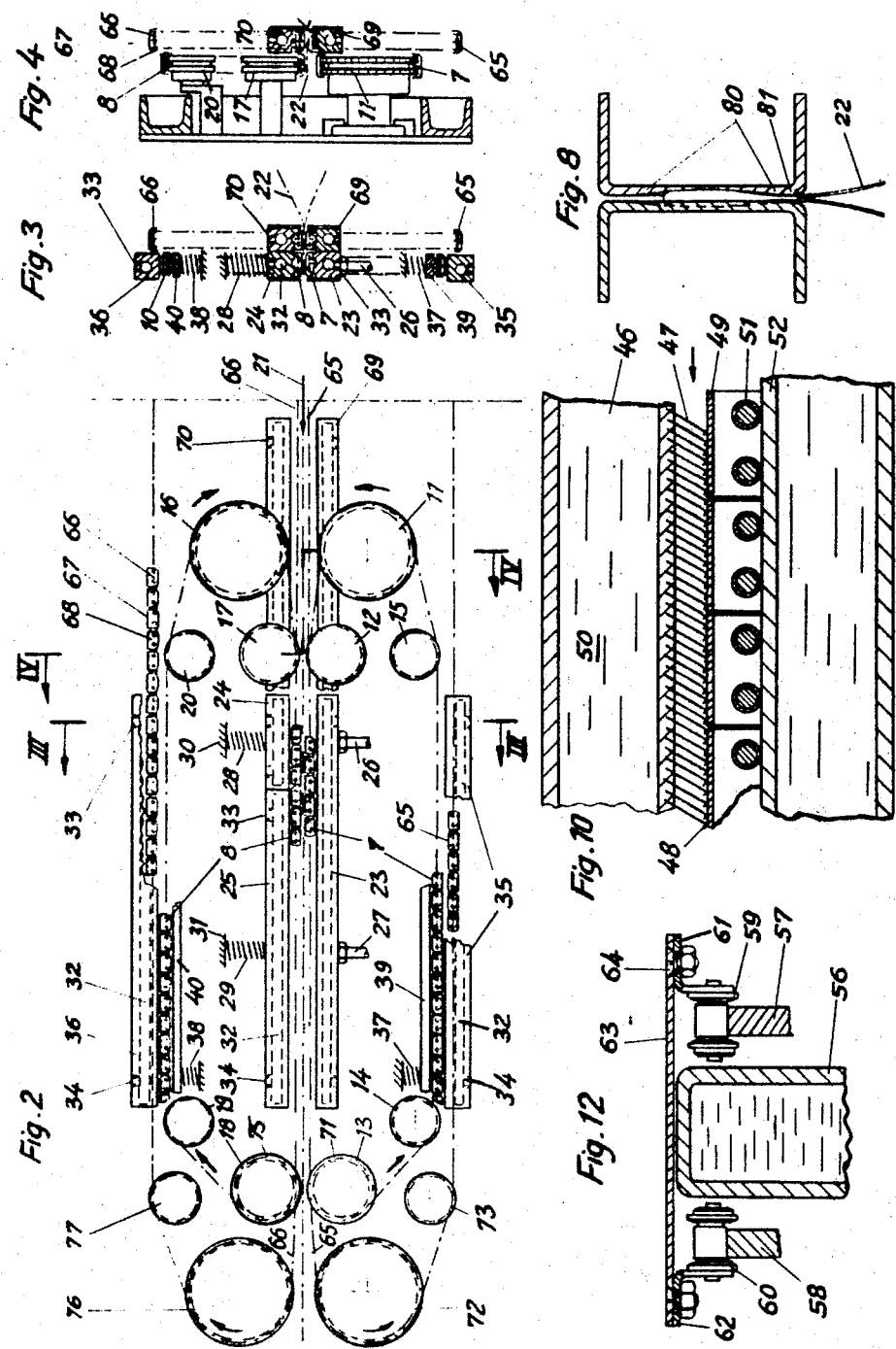

ABSTRACT OF THE DISCLOSURE

Apparatus for cooling and compressing the hot fused beads of plies of plastic material which have been heat-sealed at their end edges wherein the cooling and compressing members comprise chains having links provided with plates facing the workpiece in the cooling and pressing section.

---

This invention relates to apparatus for cooling and compressing the hot fused beads of plies of plastics material which have been heat-sealed at their end edges, preferably for machines for forming heat-sealed closing seams in filled sacks of plastics material, which machines comprise endless revolving cooling and pressing members, which grip both sides of a fused bead, formed in a heat-sealing station, and move together with the workpiece through the cooling and pressing section. In previously described devices of this kind, the revolving endless cooling and pressing members consist of two opposed, revolving steel belts, which grip the fused bead and move it through the cooling and pressing station, and cooling and pressing devices are provided, which contact each steel belt on the surface which is remote from the fused bead. Whereas a smooth seam can be obtained with these steel belts this practice has the following serious disadvantages:

(1) The nip defined by the steel belts is not sufficient for accommodating the seam, which has been expanded by the heat, so that the seam is held back to some extent and creasing may occur, which is undesirable.

(2) The cooling surface formed by the steel belts cannot exceed the length of the seam to be formed.

(3) Owing to their small thickness, the steel belts can take up only little heat so that their cooling action depends on the cooling bodies which contact the belts on the outside. The contact between the moving belts and the stationary cooling bodies is undesirable because it produces friction and inhibits the use of an appreciable contact pressure whereas such pressure would be desirable in order to ensure a snug contact and a high heat transfer. The snug contact is also adversely affected by the fact that the steel belts, which may have a thickness of e.g., 0.3 millimeter, are subjected to a very high temperature rise because they have a low heat capacity, and warp or buckle owing to their local expansion so that the heat transfer is further reduced. The friction between the belts and cooling bodies generates heat and results in a phenomenon known as seizing. The generation of heat increases with the velocity of travel so that the latter is limited. All in all, a very long cooling section is required, as the contact pressure must be low, for the reasons stated, and this fact and the fact that the surface of the belts assumes an uneven configuration result in a poor heat transfer.

(4) Even when pressure rolls are employed, the steel belts which extend continuously over the work cannot be forced against the stepped transitions from, e.g., two to four plies at the gussets of plastics material sacks with the required accuracy so that the seam may have a leak close to the step. This is not only due to the fact that the radius of the belt supported by the roller is relatively large compared to the step but also to the fact that a sufficiently high contact pressure cannot be applied because the steel belts cannot be in registry with the workpiece edge to be pressed but must protrude to some extent beyond this edge and are not supported in this portion. Experience has shown that a relatively high contact pressure on such belt causes the belt to wander.

(5) During the conveyance, there is a slip between the smooth steel belts and the workpieces so that the latter cannot be reliably conveyed at the predetermined speed between the steel belts. This may result in a lateral deflection of the workpieces.

(6) the steel belts tend to break owing to the flexing at the guiding and driving pulleys. This necessitates a frequent replacement of the steel belts, involving expenses, a loss of time and a stoppage of the machine. In most cases the steel belts break where the two ends of the steel belts are joined to form an endless belt.

(7) The steel belts tend to wander because they cannot be guided laterally in the working region.

To eliminate these disadvantages, it is proposed according to the invention that in an apparatus of the kind defined initially hereinbefore the cooling and pressing members comprise chains having links which are provided with plates which face the workpiece in the cooling and pressing section.

In this specification and the appended claims, the term "plate" is used to describe a member which has a major surface that extends generally in a plane. The chains cannot break because they have articulated joints and are not stressed when being reversed around the guiding and driving sprockets. Chains can be satisfactorily guided laterally in all regions so that they cannot wander. Besides, any desired pressure can be applied to the chains by means of the chain rollers. In addition, the plates of the chain links may have any desired thickness so that their mass may be sufficient for an adequate cooling of the seam. In this case the plates may be cooled back to the required initial temperature during their return movement along the other course of the chain, where their outside surface is accessible.

In a development of the invention, the two opposed chains are staggered by half a plate length. As a result the gaps between adjacent plates are always in the middle of an opposite plate. This results in a regular sequence of the ribs formed in the seam by hot plastics material which enters the gaps between the plates. In transparent sheeting, these ribs are spaced apart by a distance corresponding to half the length of a plate and form a regular surface configuration.

It is particularly suitable if the active surfaces of the plates are formed according to the invention with corrugation grooves, which extend transversely to the direction of movement of the plates. These grooves prevent a creasing, as occurs with steel belts, because the additional seam volume which is due to the temperature rise is accommodated in the grooves and is not held back. Moreover, the grooves form a cooling surface which is much larger than that of the steel belts. For instance, with grooves having an angle of 60°, the contact area with the sheeting is virtually doubled. This results in a much greater cooling action than is obtained with steel belts. The plies of the sheeting cannot slip between the grooved plates of the chain links so that the chains ensure an exact movement of the workpieces at the predetermined speed and a lateral deflection of the workpieces is precluded.

The grooves in opposed plates may be arranged so that each groove in one plate is in registry with a ridge formed between two grooves in the other plate. This results in a meandering seam, which has the same thickness throughout and cools uniformly. According to another suggestion of the invention, the gap between successive plates corresponds to the distance between the crests of two adjacent ridges between the grooves. In this case the ridge which is opposed to the gap will force the seam material into the gap as into a groove so that a uniform seam configuration is obtained and the gaps existing in view of the usual tolerances between the plates are not emphasized by corresponding beads of plastics material. Such beads cannot be distinguished by a normal observation from the beads which are formed by the corrugations. This eliminates expenses involved in a highly precise making of the plates in order to minimize the gaps.

Owing to its uniform embossed configuration, the corrugated seam of plastics material has a pleasing appearance and gives an impression of reliability. A corrugated embosed configuration of plastics material seams formed with intermittently operating heat-sealing jaws is already known so that there is no prejudice against such seams. Instead of the uniform corrugations, characters or trademarks may be formed as indications of quality or origin.

According to a further proposal according to the invention, the depth of the grooves may progressively decrease toward their ends and the grooves may finally merge into the smooth plate surface. Such grooves have a pleasing, gradual termination. This has the further advantage that the plates are noncorrugated in that portion which contacts the non-heated sheeting portions and determines the thickness of the seam. As a result, the pressure applied to the sheeting per unit of area may be much smaller than if the corrugations of the plates contacted the sheeting in the area between the seams.

To enable the manufacture of substantially smooth seams, which are not interpreted by beads of plastics material, high-precision plates may be manufactured, which have been suggested above. In this case the plate surfaces may be smooth and the gaps between adjacent plates may be only about 0.1 mm. Experience has shown that the plastics material does not substantially penetrate into gaps which are so small because the plastics material is immediately cooled. As a result, the formation of appreciable beads of plastics material is avoided. Such plates, however, are relatively expensive.

According to another proposal according to the invention, the same object may be accomplished more simply by the provision of relatively large gaps between adjacent plates and of thin sheet metal elements, which form the active surfaces and are secured to the plates and extend across the gaps in a direction opposite to the direction of movement, the sheet metal elements secured to adjacent plates being in overlapping contact with each other. This results in a seam surface which is absolutely smooth with the exception of steps corresponding to the small thickness of the sheet metal.

The chain plates afford the further advantage that a tight seal can be obtained much more reliably than with the previously used steel belts even at the transition from two to, e.g., four plies of the workpiece. This is due to the fact that the individual chain links better adapt themselves to the step and that any desired pressure may be applied as a lateral wandering need not be feared. In this case too it is desirable to use corrugated chain link plates because the pastelike plastics material is considerably displaced by the corrugations and the raised ridges act into the depth of the material as far as to the nominal thickness of the sheeting so that the seam material under the step is compacted and bonded and no cavity is left even at this point.

According to the invention, the reversing sprockets at the receiving end and further sprockets succeeding the reversing sprockets, may be desirably arranged so that the plates do not contact the heat-sealed seam until they have left the reversing sprockets. In this arrangement, the outwardly protruding edges of the individual plates, which edges revolve at a higher velocity around the reversing sprockets, cannot penetrate into and damage the seam of pasty plastics material.

To cool the corrugated chain link plates during their return movement, the invention suggests to provide metal wires, which wipe on the active surfaces of the plates and are embedded like bristles in a body which is flown through by a cooling fluid. This enables a cooling of the active surface of the plates even in the grooves. Instead of this arrangement or in addition to it, cold air may be blown against the chain links. It is also desirable to pass a cooling fluid through the bars for guiding the chain rollers in the working and return courses. To provide for a more intensive cooling action in the working region where only the rear of the chain is accessible, as in the active surfaces of the plates engage the workpiece, the invention suggests further to provide for each side of the workpiece a double chain having between its component chains a large spacing, which is bridged by the plates, that are connected each to one link of each chain, and to provide for an action of cooling fluids in the working region on the rear of the plates in the space between the chains. Pressure is suitably transmitted to the chains in the working region by guide bars, which cooperate with rollers of the chains so that a high friction between the cooling devices and the rear of the plates is avoided. Each double chain consists suitably of two chains having angled brackets, to which the plates are secured. This design enables the use of commercially available chains.

According to a further proposal according to the invention, the chain guide bar which transmits the pressure applied to the plates to force the latter against the seam is subdivided in the working region in the direction of movement of the chain at least on one side of the workpiece so that an adaptation to the workpieces is ensured at points where there is a change in the number of plies or the like. The cooling elements provided on the rear of the enlarged plates may be similarly divided.

The pressure members acting on the chain rollers may be suitably movable at right angles to the plane of the workpiece against spring force at least on one side of the workpiece. The members which are disposed on the other side of the workpiece path may be rigidly mounted and form an abutment.

Longer chains which carry plates and extend parallel to the cooling and pressing chains are suitably employed for conveying the workpieces through the heat-sealing station which precedes the cooling and pressing station. To prevent a gradual heating of these conveyor chains, the guide bars which are disposed on the rear of these chains and act on the chain rollers are suitably flown through by a cooling fluid.

The invention will now be described more fully with reference to an apparatus for forming heat-sealed closing seams in filled sacks of plastics material. Such apparatus is shown in the drawings, in which FIG. 1 is a diagrammatic side view showing an apparatus for forming heat-sealed closing seams in filled sacks of plastics material, which apparatus comprises a cooling and pressing station according to the invention.

FIG. 2 is a top plan view showing on a larger scale the cooling and pressing device of the apparatus of FIG. 1, FIG. 3 is a sectional view taken on line III—III in FIG. 2, FIG. 4 is a sectional view taken on line IV—IV of FIG. 2, and FIG. 5 is a fragmentary view showing the filling end of a sack of plastics material, which end is partly provided with a corrugated, heat-sealed closing seam, as well as a chain portion having cooling and pressing plates which are corrugated along their center, which chain portion contacts the rear of the sack of plastics material.

FIG. 6 is a top plan view of the structure of FIG. 5 and shows on each side a portion of a cooling and pressing chain.

FIG. 7 is a sectional view taken along line VII—VII in FIG. 5 through opposed, corrugated cooling and pressing plates shown partly broken away and on a much larger scale.

FIG. 8 is a sectional view taken on line VIII—VIII of FIG. 6 and shows on a larger scale only the cooling and pressing plates and the interposed seam.

FIG. 9 shows a chain design for producing a substantially smooth seam.

FIG. 10 is a horizontal sectional view showing a chain portion having corrugated cooling and pressing plates during the return movement through an embodiment of a cooling device according to the invention.

FIG. 11 shows an embodiment of a cooling and pressing chain and a cooling device which acts in the working region.

FIG. 12 shows an embodiment which is basically the same as that of FIG. 10 but composed of commercially available chains.

FIG. 13 is a sectional view taken on line XIII—XIII in FIG. 9 together with a cooling device according to FIGS. 11 and 12.

To illustrate the invention, an apparatus for forming heat-sealed closing seams on filled sacks of plastics material is diagrammatically shown in FIG. 1. According to a prior invention (shown in the Friedhelm Brinkmeier U.S. Patent application Ser. No. 487,422), which has been assigned to the same assignees as this invention, this apparatus comprises an opening station 1, a cleaning station 2, a preheating station 3, a pressing station 4, a heat-sealing station 5, and a pressing and cooling station 6. According to the above-mentioned prior invention, the heat-sealed edges of the sack were moved in the cooling and pressing zone with the aid of steel belts between cooling members flown through by a suitable cooling fluid and pressed together at the same time. To avoid the disadvantages of steel belts described hereinbefore, the present invention provides revolving chains 7 and 8 (FIG. 2), which grip the heat-sealed edges of the sack and apply pressure to them for a certain time. The links of these chains are provided with plates 9 (FIG. 1) on the side which faces the edges of the sack. In a first embodiment, a special double roller chain is used, which has U-shaped links 10 (FIG. 3). The rear faces of the links form the plates 9. The plates are normally smooth and spaced apart by a few tenths of a millimeter. This spacing is sufficient to take up the tolerances which are due to the stamping of the links. Such chains result in the formation of a smooth seam, which has flat ribs that have a width which is equal to the width of the gap between the plates and are spaced apart by the length of the plates. According to the invention, the two cooperating chains are so arranged relative to each other that each gap is disposed at the center of an opposed plate, as is apparent from FIG. 6. This arrangement results in a regular sequence of ribs on both sides so that the ribs provide for a pleasing appearance and form uniform corrugations having the same pitch as the chain. A seam having this appearance will be satisfactory for numerous purposes.

According to FIG. 2, the two cooperating chains 7 and 8 extend around the sprockets 11–15 and 16–20, respectively. By means not shown, the sprockets 11 and 16 are mounted so that they can be displaced opposite to the direction of movement of the workpiece, indicated by the arrow 21, in order to tension the chains. The sprockets 11 and 16 are spaced apart so that they do not move the chains into contact with the workpieces. This contact is not established until the chains proceed from the sprockets 11 and 16 to the sprockets 12 and 17. This arrangement avoids a digging of the outwardly protruding edges of the plates 9, which revolve around the sprockets 11 and 16 at higher speed, into the pasty heat-sealed seam and ensures that the contact between the chains and the workpieces begins when the chains are stretched and their plates are approximately parallel to the workpieces. When the chains 7 and 8 have gripped the workpieces 22 (FIGS. 1, 3) between themselves by the plates 9, the chains are moved between guiding and pressing bars 23, 24 and 25. As is apparent from FIG. 3, these chains are so profiled that they contact only the two adjacent chain rollers of the double roller chains. By means of pins 26 and 27, which are secured to the machine frame by means not shown, the bar 23 is mounted in a stationary position. Springs 28 and 29 are mounted on bolts not shown, which are screw-threaded into the bars and guided in the diagrammatically indicated bearings 30 and 31 and urge the bars 24 and 25 against the stationary bar 23 to transmit pressure to the gripped workpieces. The fact that the resilient bar is subdivided into two separate bars 24 and 25 enables an improved adaptation of the chains to workpieces having different numbers of plies. The bearings 30 and 31 for the guide pins, not shown, that are associated with the springs 28 and 29 are provided with concave bores so that the guide pins are self-aligning. To effect a cooling of the chains in the working region, the guiding and pressing bars are provided with longitudinal bores 32. Each of these bores is connected by tapped inlet and outlet bores 33, 34 and means, not shown, to a cooling fluid conduit. As the heat transfer from the U-shaped links through the chain rollers to the guide rails is relatively poor, the cooling is mainly effected according to the invention during the return movement of the chain when the plates 9 forming the back of the U-shaped links 10 can be directly moved past a cooling bar. Whereas FIGS. 2 and 3 show for the sake of clearness the plates spaced from the cooling bars 35 and 36, the plates actually contact the cooling bars 35 and 36 under the pressure of springs, such as 37 and 38. The springs are mounted at each end by means, not shown, and act by means of guiding and pressing bars 39, 40 on the rollers of the chains. The cooling bars 35 and 36 are provided with a longitudinal bore 32 and with tapped inlet and outlet bores 33 and 34 for the flow of the cooling fluid.

To obtain an embossed seam structure, which improves the quality of the seam, particularly at steps formed owing to the differences in the number of plies, the plates 9 may be provided with transverse corrugations. The gaps between the plates and the corrugations suitably match each other as is shown on an enlarged scale in FIG. 7. The width of the gaps 78 between adjacent plates 9 corresponds to the pitch of the corrugations 79. Besides, the corrugations are so arranged on the plates that a corrugation ridge is exactly opposite to the center of a gap 78. This causes the seam material to be forced into the gap approximately as in the remainder of the corrugations so that a uniform seam configuration is apparent to the normal viewer. At the same time, each ridge of the corrugations of one plate is in registry with a groove of the corrugations of the opposite plate so that a meandering seam is formed, which has the same thickness throughout and cools uniformly.

Suitably the corrugations do not extend throughout the width of the plate but are restricted to the central portion of the plates, as is shown in FIGS. 5 and 8, and form smooth transitions at the ends, as is indicated at 80 in FIG. 8. The resulting corrugated seam then has a pleasing taper at its ends and the solid plate contacts the non-heated portion 81 (FIGS. 5, 8) of the sheeting elements 22 so that the sheeting is not damaged or marked in this portion. The plates must contact the cold sheeting beyond the heated region to ensure that the thickness of the same is reduced to a value which is equal to two thicknesses of the sheeting.

When it is desired to obtain a substantially smooth seam, the links 10 may be left smooth and subjected to a precision machining operation so that they may be mounted in the chain with a spacing of only one tenth of a millimeter. The pasty consistency of the sheeting and the accelerated cooling thereof prevent a substantial penetration of the sheeting into such a narrow gap so that the seam may be considered smooth.

A substantially smooth seam may also be obtained with the aid of a chain 42, which is shown in FIG. 9 and has larger gaps between its U-shaped links 43. A thin, stiff sheet 44 is secured to each link 43, e.g., by electric spot welding or brazing, and extends opposite to the direction of movement 45 over the next succeeding sheet. A seam which is produced between such chains has only very slight steps, corresponding to the thickness of the sheets. The ends of the sheets may be bevelled so that there is not even a step.

The corrugated plates also have the advantage of increasing the contact surface between the plates and the sheeting so as to enable a very rapid dissipation of heat. On the other hand, the reverse operation, in which the plates are cooled during the return movement of the chain by a movement of the plates along a cooling bar, is less satisfactory than with a smooth plate because only the protruding parts of the plate contact the cooling bar. To avoid this disadvantage, the cooling bar 46, which is shown in section in FIG. 10 and flown through by a cooling fluid, is provided with metal bristles 47 arranged is in a brush. The ends 48 of these bristles are preferably reversely bent like hooks and slide resiliently on the corrugated, U-shaped links 49 and enter the corrugations to remove the heat from the entire surface and conduct said heat to the fluid 50 flowing in the cooling bar 46. For an intensified cooling action, the bar 52 which is forced against the chain rollers 51 may also be flown through by a cooling fluid. In this case the bars 46 and 52 according to FIG. 10 replace the bars 35, 39 and 36, 40 of FIG. 2.

To effect an intense cooling in the working region of the chains, a chain as shown in FIG. 11 may be used, which has substantially enlarged U-shaped links 53. This arrangement provides between the component chains 54 and 55 a space in which a cooling bar 56, which is flown through by a cooling fluid, can be applied to the rear of the U-shaped links 53. It is not suitable to us the cooling bar for pressing because this would involve a heavy wear. Instead, the pressure applied may be transmitted to the chain rollers through separate pressing bars 57 and 58, which may be made from plastics material to ensure a particularly smooth running.

For the same purpose, and as shown in FIG. 12, two commercially available roller chains 59 and 60 provided with angle brackets 61 and 62 may be used in such a manner that the chains are secured by means of the angle brackets and, e.g., countersunk screws 64, to additional plates 63 at the required distance so that a cooling bar 56 can also be applied to the rear of the plates. This arrangement has the advantage that a commercially available chain may be used. The angle brackets of this chain may be reversed so that the free flange extends over the chain and the overall width is reduced. A further advantage resides in that the plates may be made from a material other than that of the chains and may consist of brass. Such material may be selected to resist chemical action from the seam and water which condenses on the cooling surfaces. The plates 63 may be provided with the desired corrugations, which may be interrupted by brands or trademarks forming indications of quality or origin that are impressed into the seam. If continuous corrugations are used, the plates 63 may be made at low cost from drawn corrugated strip material.

FIG. 13 is a cross-sectional view of a chain according to FIG. 9 and shows a cooling device which is designed like that of FIG. 11. Corresponding reference characters are used.

To cool the chains during their return movement, a cooling chamber may be provided, which is subcooled in its interior by a refrigerating machine. This method of cooling as well as a cooling with cooling air blown onto the plates require no frictional contact with a cooling surface.

Instead of slipping belts, which tend to wander, revolving chains 65 and 66 provided with plates 67 are used for conveying the filled plastics material sacks 22 to be closed and for engaging the edges of the filling openings of said sacks with each other. These sacks are carried by a belt conveyor, not shown. The chains 65 and 66 consist of special double roller chains having U-shaped links 68, the backs of which form the plates 67. These chains move the filling end of the sacks past the preheating and heat-sealing stations 3, 5 and are also cooled in these stations, and suitably in the pressing and cooling station, by bars 69 and 70, which are flown through by a cooling fluid, to prevent a gradual temperature rise of such chains. The bars 69 and 70 may be divided in a manner not shown and are profiled to engage the chain rollers. They serve at the same time for pressing the cooperating chain courses against each other. For this purpose the cooling bar or bars associated with one chain is or are subjected to the pressure of springs, not shown, as has already been described for the bars 24 and 25 associated with the cooling and pressing chain.

Chains 65 and 66 are trained around sprockets 71, 72, 73 (FIG. 2) and 74 (FIG. 1) on the one hand and 75, 76 and 77, on the other hand. The sprockets 72 and 76 are driven by means, not shown. The sprockets 13 and 71 (see also FIG. 1) on the one hand, and 18 and 75, on the other hand, have a common hub, through which a drive is transmitted from chains 65 and 66 to chains 7 and 8.

The frame parts and mountings for the chain sprockets 11, 17 and 20 are represented in FIG. 4 and are not shown, for the sake of simplicity and clearness, in FIGS. 1 and 2, where they would obscure, e.g., the structure shown in FIG. 2.

What is claimed is:

1. In an apparatus for forming heat-sealed closing seams in filled sacks of plastic material, an apparatus for cooling and compressing said heat-sealed seams, said apparatus comprising a pair of endless conveying means positioned so as to grip the tops of said sacks therebetween with said heat-sealed seams extending beyond said conveying means and to convey the tops of said sacks in the longitudinal direction of said heat-sealed seams through said apparatus; means to cool and compress said seams comprising at least two opposing chains revolving parallel to said conveying means in the region of said heat-sealed seams, each link of each of said chains having a plate at the seam-engaging outer surface thereof so as to provide each of said chains with a substantially continuous series of said plates along the outer portion thereof cooperating to press against each side of said seams.

2. Apparatus according to claim 1, further comprising means to guide said plates along an endless path, said guide means comprising a plurality of guide bars disposed adjacent at least a portion of said path, and means to urge said bars into engagement with said chains.

3. Apparatus according to claim 2, further comprising means to cool said plates, said cooling means comprising a conduit extending through at least a portion of said guide means, and means to flow a cooling fluid through said conduit.

4. Apparatus according to claim 3 wherein said cooling means further comprises a plurality of metal bristles extending from a portion of said portion of guide bars and engaging said plates to remove heat therefrom.

5. Apparatus according to claim 1 wherein the opposed chains are staggered by half a plate length.

6. Apparatus according to claim 1 wherein the seam engaging surfaces of the plates are formed with corrugation grooves which extend transversely to the direction of conveyance of the plates.

7. Apparatus according to claim 6 wherein said corrugation grooves of opposed plates are so arranged that each groove of one plate is in registry with a ridge formed between two grooves of its cooperating plate.

8. Apparatus according to claim 7 wherein the distance between successive plates corresponds to the distance between adjacent ridge crests of the corrugations.

9. Apparatus according to claim 6 wherein the depth of the corrugation grooves decreases progressively toward their ends and the grooves merge finally into the smooth surface of the plates.

10. Apparatus according to claim 1 wherein the plate surfaces are smooth and the gaps between adjacent plates substantially equal 0.1 mm.

11. Apparatus according to claim 1 wherein relatively large gaps are provided between adjacent plates and further comprising a plurality of thin sheet metal elements which engage said seams, said elements being secured to the plates and extending across the gaps against the direction of movement of the plates, the sheet metal elements of adjacent plates being in overlapping contact with each other.

12. Apparatus according to claim 1 further comprising reversing sprockets at the receiving end of said apparatus for reversing said revolving chains, and additional sprockets succeeding said reversing sprockets and arranged so that the plates do not contact the heat-sealed seam until they have left the reversing sprockets.

13. Apparatus according to chain 1 wherein a double chain having widely spaced component chains is provided for each side of the seam, said plates bridging the space between the component chains and connected each to one link of each chain, and wherein said cooling means comprises a cooling bar disposed in the working region on the rear of the plates in the space between the chains.

14. Apparatus according to claim 13 wherein each double chain comprises two chains having angle brackets to which said plates are secured.

15. Apparatus according to claim 2 wherein at least one of said guide bars is subdivided in the direction of movement of said chain at least on one side of the seam.

16. Apparatus according to claim 2 wherein said means to urge said bars into engagement with said chains comprise pressure members movable at right angles to the plane of the seam against a spring force at least on one side of the seam.

References Cited

UNITED STATES PATENTS

| | | | |
|---|---|---|---|
| 2,003,337 | 6/1935 | Brady et al. | 156—464 X |
| 2,106,740 | 2/1938 | Hepke | 156—498 X |
| 2,164,502 | 7/1939 | Cundall et al. | 156—464 X |
| 2,262,192 | 11/1941 | Morin et al. | 156—580 X |
| 2,434,657 | 1/1948 | Irmscher | 156—583 X |
| 2,606,850 | 8/1952 | Piazze | 156—499 X |
| 3,131,623 | 5/1964 | Seefluth | 156—583 X |
| 3,315,439 | 4/1967 | Pierre | 53—3 |

EARL M. BERGERT, Primary Examiner

G. W. MOXON II, Assistant Examiner

U.S. Cl. X.R.

53—373; 100—93; 156—581, 583